United States Patent [19]

Hofmann

[11] Patent Number: 4,567,994

[45] Date of Patent: Feb. 4, 1986

[54] CONTAINER CLOSURE HAVING INTERNAL FASTENING MEANS

[75] Inventor: Heinz A. Hofmann, Treuchtlingen, Fed. Rep. of Germany

[73] Assignee: Walter Alfmeier GmbH & Co., Treuchtlingen, Fed. Rep. of Germany

[21] Appl. No.: 704,000

[22] Filed: Feb. 21, 1985

[30] Foreign Application Priority Data

Feb. 22, 1984 [DE] Fed. Rep. of Germany ... 8405440[U]

[51] Int. Cl.⁴ .............................................. B65D 53/00
[52] U.S. Cl. .................................... 220/234; 220/237; 220/238
[58] Field of Search ............... 220/233, 234, 237, 238, 220/DIG. 32, DIG. 33

[56] References Cited

U.S. PATENT DOCUMENTS 2,741,393 4/1956 Millard ................................ 220/236
3,606,070 9/1971 Shepherd ........................... 220/234

FOREIGN PATENT DOCUMENTS 0027970 1/1984 European Pat. Off. .

Primary Examiner—George T. Hall
Attorney, Agent, or Firm—Spencer & Frank

[57] ABSTRACT

A closure assembly for a container includes a filler nipple formed on the container and having an inner wall provided with a depression, a plug unit and an operating lever pivotally supported on the plug unit, and a sealing ring received in a groove of the plug unit. The sealing ring has a radially outwardly expanded sealing state and a relaxed, non-sealing state. A sealing ring actuating device is operatively connected to the sealing ring and the operating lever for moving the sealing ring from one state to another upon movement of the operating lever between an intermediate position and a closed position. A locking bolt arrangement is supported in the plug unit and has an advanced, locking state and a withdrawn, unlocking state. There is further provided a bolt actuating device operatively connected to the locking bolt arrangement and the operating lever for moving the locking bolt arrangement from one state into the other upon movement of the operating lever between an open position and the intermediate position.

20 Claims, 11 Drawing Figures

CONTAINER CLOSURE HAVING INTERNAL FASTENING MEANS

BACKGROUND OF THE INVENTION

This invention relates to a closure assembly for a container, particularly of the type disposed under the hood of automotive vehicles. The closure assembly comprises a filler nipple (which is an integral part of the container), a plug unit and a pivotal actuating lever operating the plug unit. The plug unit may be locked in the filler nipple by means of a component of the plug unit releasably extending into a depresson provided on the inner wall face of the filler nipple. The plug unit includes a plug housing and a sealing ring accommodated in an annular clearance defined by the plug housing. The sealing ring is made of a flexible material and may be radially expanded against the inner wall of the filler nipple by spreader fingers and is, by means of its cross-sectional deformation occurring during such expansion, pressed against the housing walls defining the annular clearance.

A closure assembly of the above-outlined type is known and is described, for example, in European Pat. No. 27,970.

Upon closing the plug unit of the known closure assembly, the sealing ring is, by means of its radial expansion, form-fittingly pressed into an annular groove formed in the inner wall of the filler nipple. The sealing ring performs both a sealing function and a holding function. Under extreme stresses, for example, in case of an accident, the holding force of the known construction may prove to be insufficient. Further, the aeration or air removal involved in the opening of the plug unit presents problems in containers which are maintained under or above atmospheric pressure.

SUMMARY OF THE INVENTION

It is an object of the invention to provide an improved container closure assembly of the above-outlined type which ensures that in the closed position, even under extreme stresses, a large holding force is exerted on the plug unit and further, an aeration of, or air removal from, the inside of the container may be effected without endangering the user, even in the event of significant differences between atmospheric and container pressures.

These objects and others to become apparent as the specification progresses, are accomplished by the invention, according to which, briefly stated, the plug unit has a locking bolt which is adapted to engage into a depression in the filler nipple and which is slidably supported by the plug housing. Further, the actuating lever operating the plug unit is operatively connected with the locking bolt and the actuating lever, and during its pivotal motion from the closed position to the open position, operatively engages, in a first range of motion, the sealing ring and, in a second range of motion, operatively engages the locking bolt.

The invention provides that the holding function and the sealing function of the plug unit are performed by separate structural parts. For example, during the opening motion of the pivotal actuating lever from a closed position to a half-open position (intermediate position), first the sealing ring is allowed to contract from its expanded (sealing) position to its non-sealing state, while the holding or locking effect is still fully maintained. In such an intermediate position of the pivotal lever, any over-pressure within the container (for example, in case of a coolant container in automotive vehicles) may be released without removing the plug unit from the filler nipple. Only upon a further opening motion of the pivotal lever is the lock between the plug unit and the filler nipple released.

DESCRIPTION OF THE PREFERRED EMBODIMENT

Figure 1:
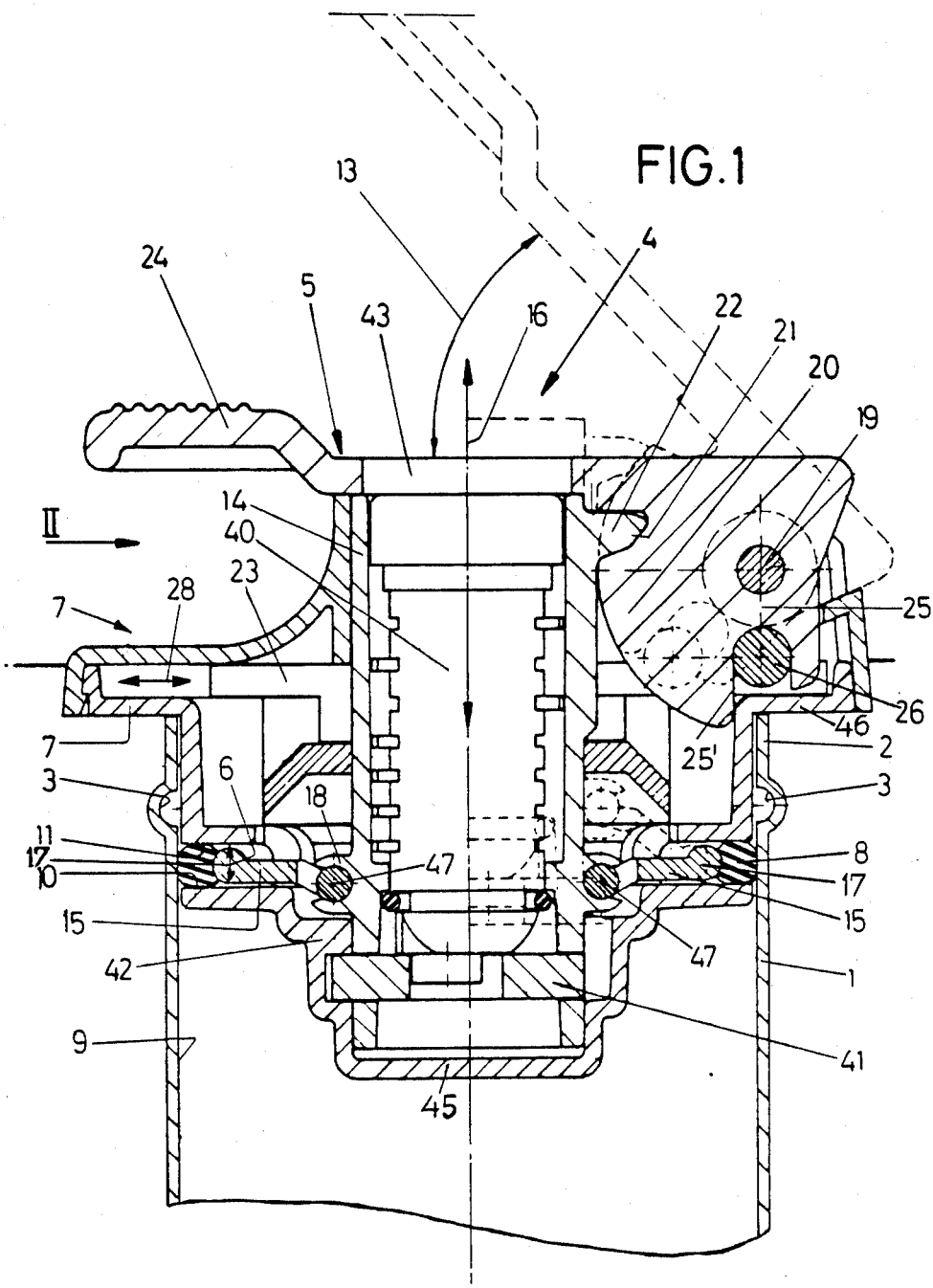
FIG. 1 is a sectional elevational view of a preferred embodiment of the invention.
Figure 2:
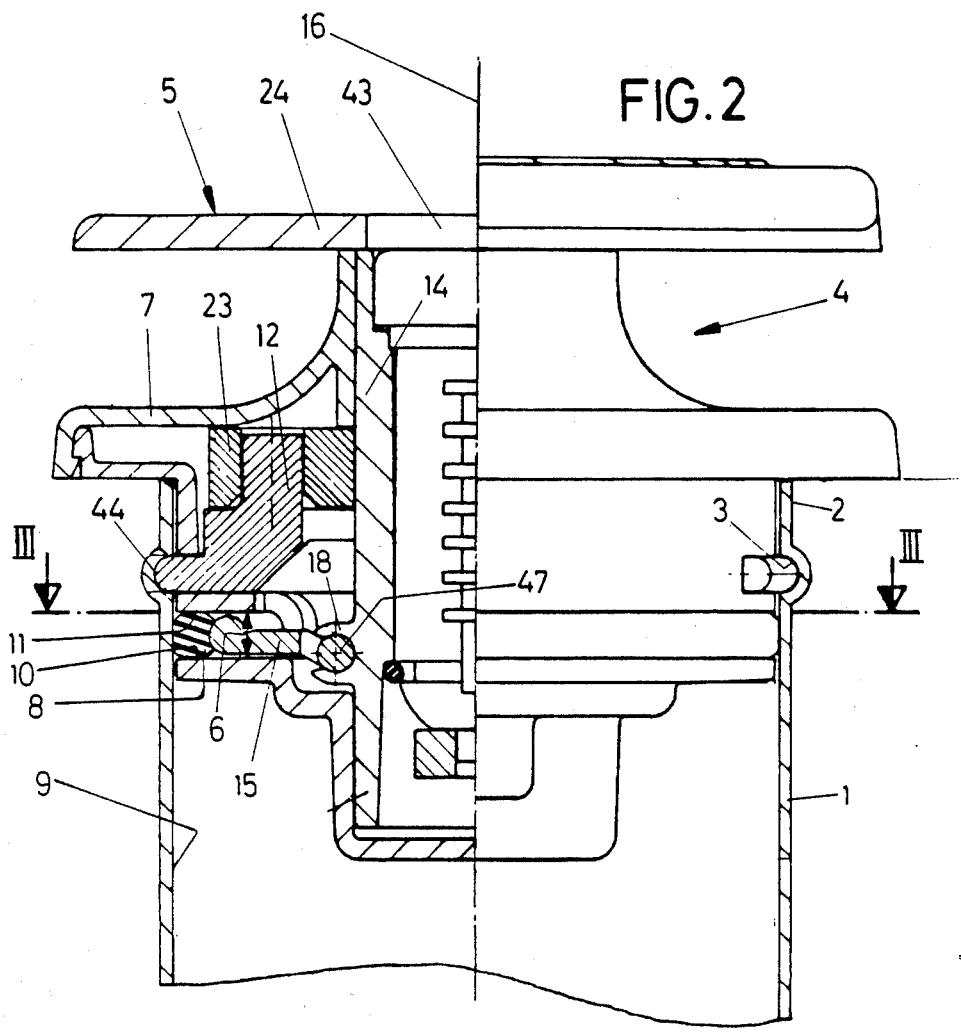
FIG. 2 is a sectional elevation of the preferred embodiment as viewed in the direction of arrow II of FIG. 1.
Figure 3:
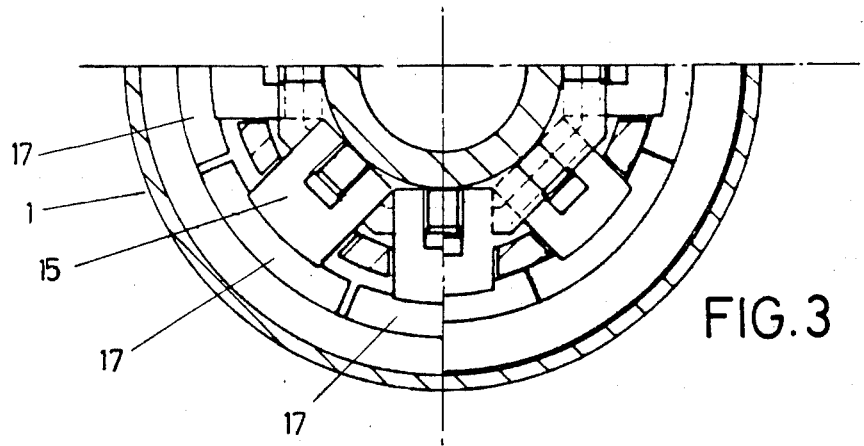
FIG. 3 is a sectional view taken along line III—III of FIG. 2.

Turning to FIGS. 1, 2 and 3, there is illustrated a filler nipple 1 forming part of a container, not shown. Adjacent its upper terminal edge 2 the filler nipple 1 has an annular depression 3 which may be formed by an outwardly convex annular embossment provided in the filler nipple 1.

The filler nipple 1 may be closed fluid tight by a plug unit generally designated at 4. As will be described in detail later, the plug unit 4 may be locked to the filler nipple 1 upon actuation of a pivotal lever 5 by parts extending into the annular depression 3. The plug unit 4 includes a plug housing 7 which defines an annular clearance 6 accommodating a sealing ring 8 of a resilient material. The sealing ring 8 is radially outwardly expandable against the inner wall 9 of the filler nipple 1 and, by virtue of the cross-sectional deformation occurring during such expansion, the sealing ring 8 is pressed against the side walls 10 and 11 which form part of the housing 7 and which bound the annular clearance 6.

The plug unit 4 has, at diametrally opposite sides, two locking bolts 12 which may be moved into a locking engagement with the annular depression 3. One locking bolt 12 is shown in FIG. 2, while both locking bolts 12 are illustrated in the perspective FIG. 11. The pivotal lever 5 is operatively connected with the locking bolts 12. The pivotal path 13 of the pivotal lever 5 from the closed position (illustrated in solid lines in FIG. 1) into the open position (shown in phantom lines in FIG. 1) has a first and a second range. In the first range (FIGS. 4–7) the pivotal lever 5 is in operative engagement with the sealing ring 8 and in the second range of the pivotal path 13 (FIGS. 8 and 9) the pivotal lever 5 is in operative engagement with the locking bolts 12, as will be described in detail later.

A sleeve-like lifter 14 is accommodated for longitudinal sliding motion in the housing 7 parallel to the longitudinal axis 16 of the plug unit 4. The lifter 14 has, about its outer circumference, radially outwardly projecting spreader fingers 15 which are pivotally held in sockets 18 of the lifter 14, whereby the radially outer, free end of the spreader fingers 15 may swing generally parallel to the longitudinal axis 16. The spreader fingers 15 project into the annular clearance 6 of the housing 7 and have, adjoining the inner circumference of the sealing ring 8, an annular segment 17. In the one end position of the lifter 14, shown in FIGS. 6 and 8, the sockets 18 for the spreader fingers 15 are situated above the radial plane of the sealing ring 18, whereas in the other terminal position of the lifter 14, shown in FIGS. 1, 2 and 4, the sockets 18 are situated below the radial plane of the sealing ring 8.

Figure 4:
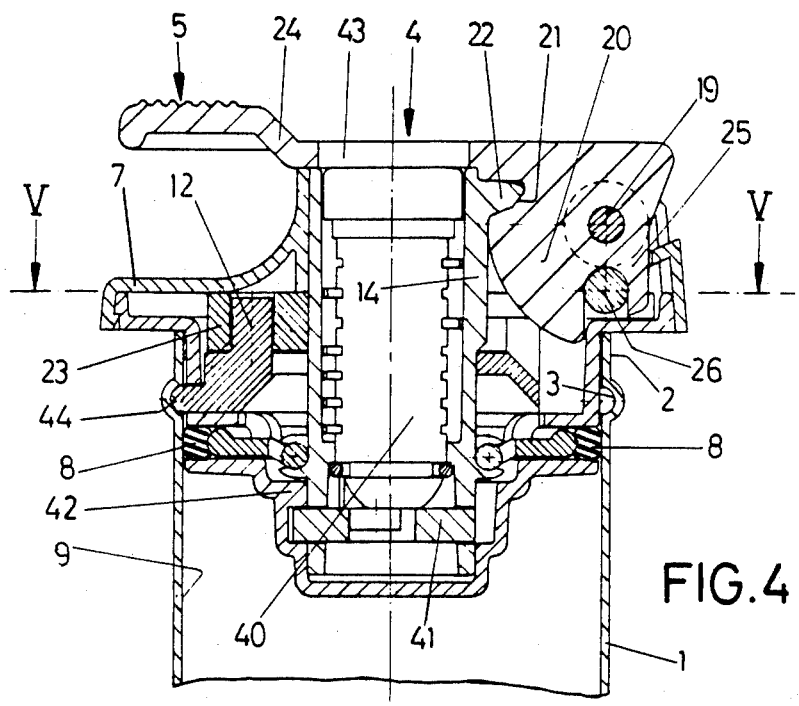
FIG. 4 is a sectional elevational view, taken along line IV—IV of FIG. 5, showing the structure in a fully closed position.
Figure 5:
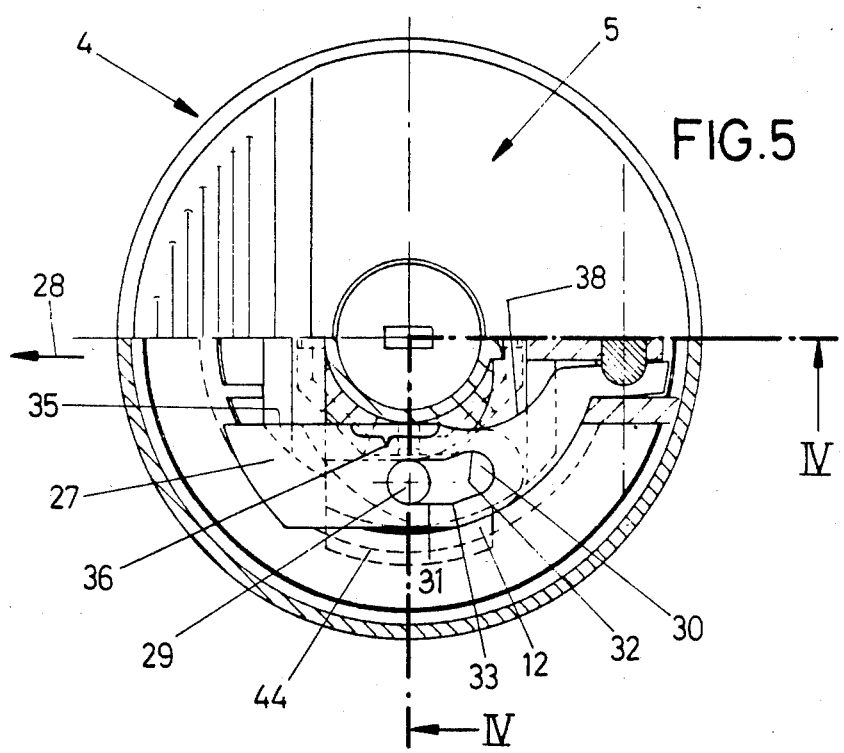
FIG. 5 is a sectional view taken along line V—V of FIG. 4.
Figure 6:
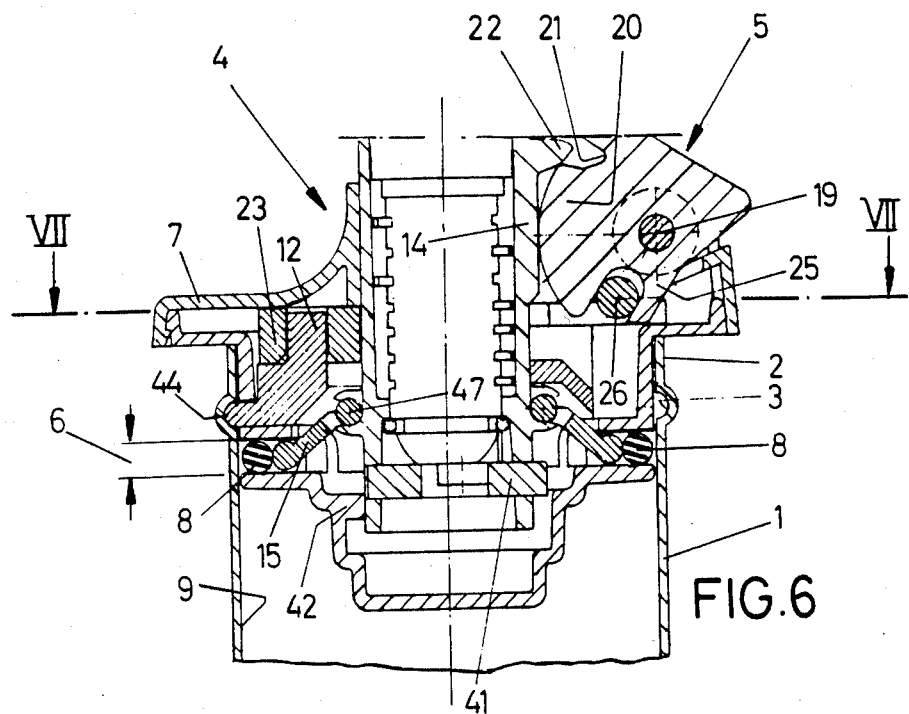
FIG. 6 is a sectional elevational view, similar to FIG. 4, showing the construction in a half-open position.

The operating lever 5 is eccentrically supported on the housing 7 for pivotal motion by a pivot pin 19. The pivotal lever 5 has an actuator segment 20. The lifter 14 is in engagement with the actuator segment 20 only in the first path range of the pivotal lever 5, as shown in FIGS. 4, 5 and 6. The actuator segment 20 has on its circumference a recess 21 into which projects, in the first range of the pivotal path 13, an actuator lug 22 formed on the lifter 14 and extending radially outwardly therefrom.

The pivotal lever 5 operatively engages a control slide 23 which is shiftable in a direction perpendicular to the axis 16 and which, in turn, is in operative engagement with the two diametrally oppositely located locking bolts 12. The pivotal lever 5 is a two-arm lever, one arm of which is a manually engageable handle part 24, while its other arm 25 is articulated to the control slide 23. The arms 24 and 25 of the pivotal lever 5 are arranged at 90° to one another. The articulation between the pivotal lever 5 and the control slide 23 is effected by a rotary sliding joint formed of an outwardly open radial slot 25' provided in the actuator segment 20 in the zone of the arm 25 and a pin 26 which is straddled by the slot 25' and which forms part of the control slide 23.

In the fully closed position (FIGS. 1, 2 and 4) the arm 24 (that is, the manually engageable handle) of the pivotal lever 5 is situated approximately at a right angle to the axis 16 and, in this position, engages the top of the plug housing 7. At the same time, the other arm 25 of the pivotal lever 5 is oriented towards the sealing ring 8.

Figure 7:
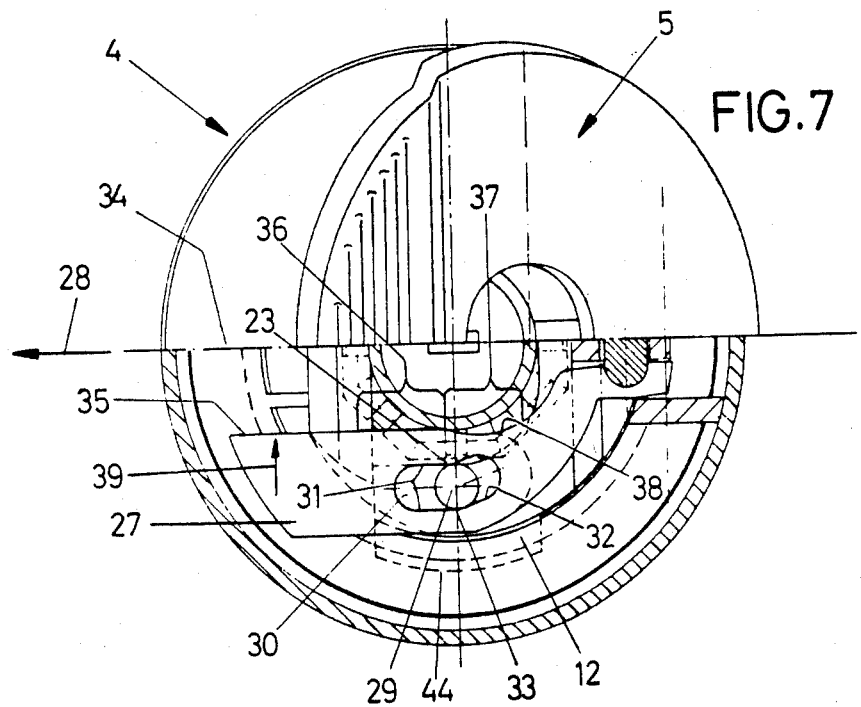
FIG. 7 is a sectional top plan view taken along line VII—VII of FIG. 6.
Figure 9:
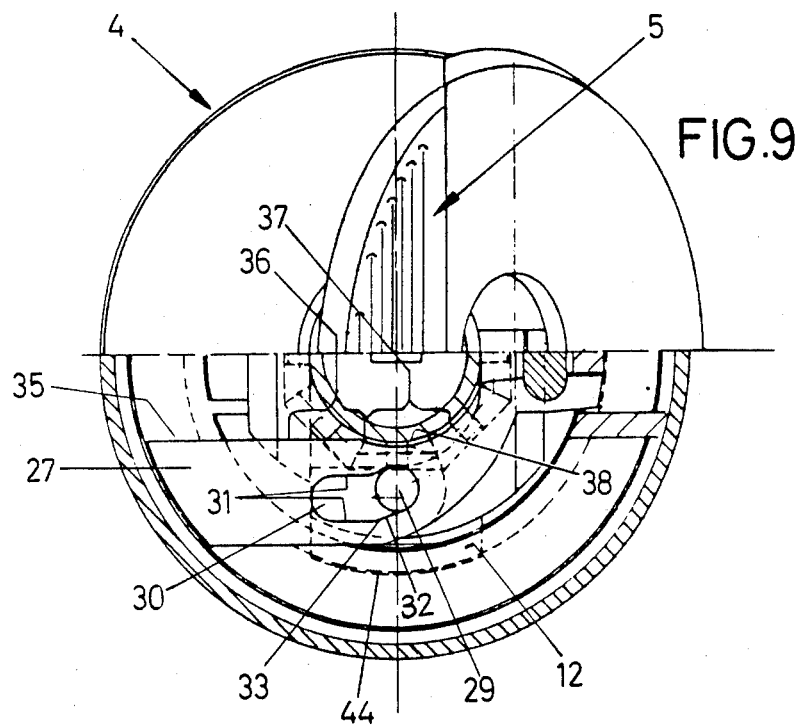
FIG. 9 is a sectional view taken along line IX—IX of FIG. 8.
Figure 11:
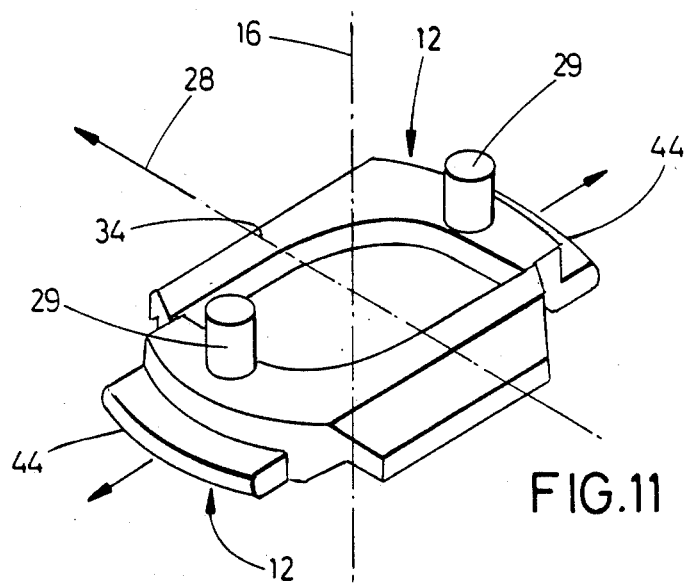
FIG. 11 is a perspective view of another component of the preferred embodiment.

The shifting path 28 of the control slide 23 is parallel to the pivotal plane of the actuating lever 5. As seen, for example, in FIG. 5, the control slide 23 has essentially the shape of a "U" which lies in a plane perpendicular to the axis 16. The lifter 14 is arranged between the legs 27 of the U-shaped control slide 23. The pin 26 connecting the legs 27 of the control slide 23 is engaged in the slot 25' of the segment 20 of the pivotal lever 5, as noted earlier. The two locking bolts 12 which are supported in the plug housing 7 are arranged diametrically opposite with respect to the axis 16 and are radially shiftable perpendicularly to the direction of displacement 28 of the control slide 23. As best seen in FIG. 11, each locking bolt 12 has a pin 29 which, as illustrated in FIGS. 5, 7 and 9, is received in a control slot 30 provided in the legs 27 of the control slide 23 and extending essentially in the shifting direction 28. Each control slot 30 is, as seen, for example, in FIG. 5, composed of two parts 31 and 32 oriented at an obtuse angle to one another. The part 31 of the control slot 30 which is oriented away from the pivotal support 19 of the pivotal lever 5 extends parallel to the shifting direction 28 of the control slide 23 while the slot part 32 oriented towards the pivot 19 or the pin 26 extends from the angle point 33 of the slot 30 towards the central longitudinal axis 34 of the control slide 23. Thus, the slot parts 32 are convergent with respect to one another in the direction of the pin 26.

Each leg 27 of the control slide 23 has an inner edge 35 provided with a length portion 36 which extends approximately parallel to the shifting direction 28 and which is adjacent the slot part 31. The control slide 23 engages the lifter 14 within the zone of the length portion 36.

The inner edges 35 of the two legs 27 of the control slide 23 have a length portion 37 which is adjacent the slot part 32 and which is curved to form a recess 38 receding in the direction of the control groove 30. The legs 27 of the control slide 23 may be moved resiliently with respect to one another in the direction 39 shown in FIG. 7.

The lifter 14 has a sleeve-like configuration and has in its inner space a key-operated cylinder lock 40. The locking bolt 41 of the cylinder lock 40 is supported inside the lifter 14 and may be shifted in the radial direction. The locking bolt 41 passes through the wall of the lifter 14 and is adapted to project behind a shoulder 42 of the housing 7, whereby the lifter 14 and the operating lever 5 are locked in their closed position, as shown in FIG. 4. The manually engageable arm 24 of the actuating lever 5, in its zone which covers the lifter 14 in the closed position of the pivotal lever 5, is provided with an aperture 43 for introducing a key to operate the cylinder lock 40 for withdrawing or advancing the locking bolt 41.

Figure 8:
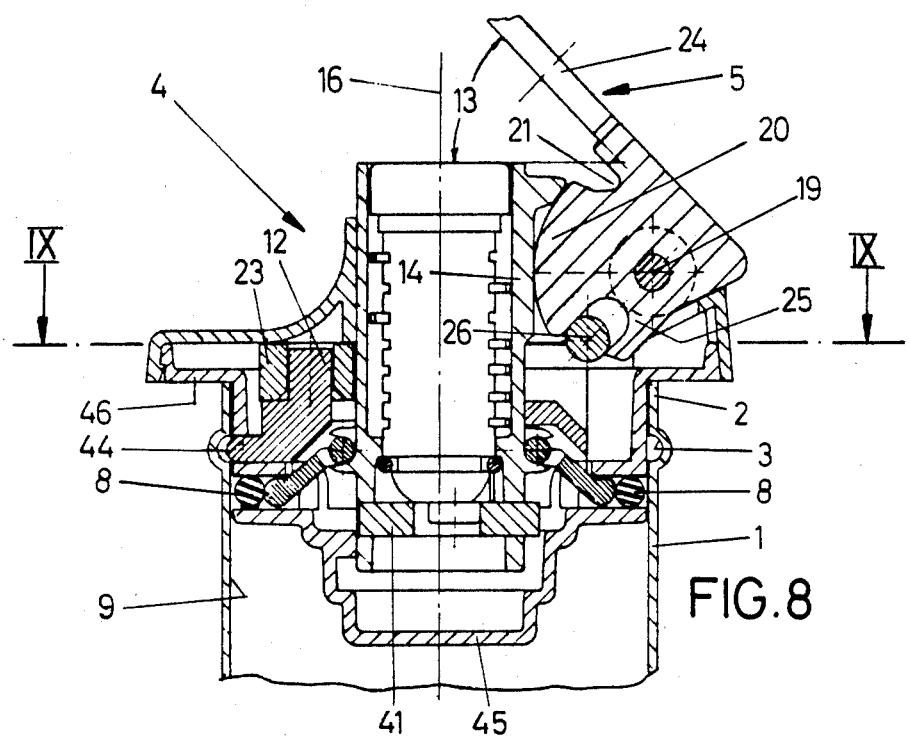
FIG. 8 is a sectional elevational view, similar to FIGS. 4 and 6, in a fully open position of the structure.
Figure 10:
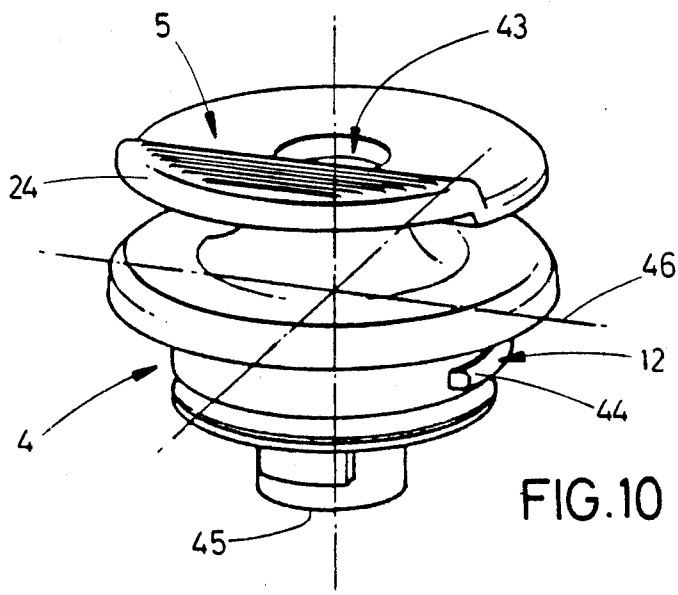
FIG. 10 is a perspective view of one component of the preferred embodiment.

The end faces 44 of the locking bolts 12 which engage into the annular recess 3, are, as shown in FIGS. 10 and 11, at least at their side oriented towards the outer end of the plug unit 4 bevelled or rounded and the bevelled or rounded parts are, even in the open position of the pivotal lever 5 slightly projecting into the annular recess 3, as shown in FIG. 8.

For closing and locking the plug unit 4, the latter is, with its inner end 45 introduced into the filler nipple 1 until the annular flange 46 of the housing 7 lies against the upper edge 2 of the filler nipple 1. In this position, shown in FIGS. 8 and 9, the end faces 44 of the two locking bolts 12 project, with a snapping action, slightly into the annular recess 3 of the filler nipple 1. In this position, the plug unit 4 may be removed from the filler nipple 1 only by applying a moderate manual pulling force directed upwardly and parallel to the axis 16, since the resilient resisting force exerted by the leg 27 on the locking bolts 12 has to be overcome and the locking bolts 12 have to be disengaged from their engagement with the annular recess 3.

Thereafter, the operating lever 5 is pivoted through its second range of the pivotal path 13 counterclockwise into the position shown in FIGS. 6 and 7. During this occurrence the control slide 23 is shifted towards the right, from the position in FIGS. 8 and 9 to the position in FIGS. 6 and 7. Thus, the two locking bolts 12 slide with their pins 29 inside the control slot 30 along the lateral walls forming the slot part 32 and are consequently pressed radially outwardly and project into the annular recess 3. In the intermediate position of the pivotal lever 5 shown in FIGS. 6 and 7, the locking bolts 12 have already reached their final locking position. The plug unit 4 is thus form-fittingly locked to the filler nipple 1.

Upon further pivotal motion of the operating lever 5 through the first pivotal range in a counterclockwise direction from the intermediate position shown in FIGS. 6 and 7 into the closed position shown in FIGS. 4 and 5, the lever 5, with the recess 21 of its actuator segment 20, catches the actuator lug 22 of the lifter 14 and presses the lifter 14 downwardly parallel to the axis 16. During this occurrence, the spreader fingers 15 are, in a toggle-like manner, pressed radially outwardly against the inner circumference of the sealing ring 8. In this manner, the sealing ring 8 is uniformly radially expanded outwardly and, as its cross-sectional outline undergoes deformation, it is pressed against the inner wall 9 of the filler nipple 1, as well as against the lateral walls 10 and 11 defining the annular clearance 6 of the housing 7 of the plug unit 4. By virtue of such pressure effect, a fluid tight seal between the plug unit 4 and the filler nipple 1 is established. During the downward motion of the lifter 14 the joint end 47 of each spreader finger 15 passes through its respective dead center with respect to its radially outer end which carries the annular segment 17 engaging the sealing ring 8. In the final closed position according to FIGS. 1, 2 and 4, the joint ends 47 of the spreader fingers 15 are situated underneath the dead center position and thus the sealing ring 8 is, in a stable manner, immobilized in its radially outwardly expanded, sealing position. In case of an accident, even if the upper part of the plug unit 4 is sheared off, the fluid tight seal is automatically preserved.

During the pivotal closing motion of the operating lever 5 through its first pivotal range from the mid position shown in FIGS. 6 and 7 into the closed position shown in FIGS. 4 and 5, the control slide 23, by virtue of the cooperation of the recess 25′ and the pin 26 continues its movement towards the right, whereupon the pin 29 of the respective locking bolt 12 climbs from the recessed part 38 of the legs 27 onto the length portion 36 thereof. The pin 29 assumes its end position in the fully closed state of the plug unit 4 at the left terminus of the slot part 31 as shown in FIG. 5. Further, diametrically opposite outer surface parts of the lifter 14 engage the inner sides 35 of the levers 27 within the zone of the length portion 36, thus preventing the legs 27 from resiliently moving inwardly in the fully closed state. As a result, the locking bolts 12, with their arcuate segmented part 44 are immobilized in the annular groove 3 of the filler nipple 1 as seen in FIG. 4.

Thus, according to the invention, the fluid tight sealing assembly comprising the sealing ring 8 and its actuator 14 and 15 are structurally separate from the plug locking (holding) arrangement which clamps the plug unit 4 firmly to the filler nipple 1 and which essentially comprises the locking bolts 12 and the actuator slide 23. Both actuators, namely, the lifter 14 and the control slide 23 are moved by the pivotal lever 5 in sequence as the lever 5 moves through consecutive ranges of pivotal motion. As a result, during plug closing, first the plug is clamped to the filler unit and thereafter the sealing ring 8 is expanded to provide a fluid tight seal whereas, conversely, during the opening motion, first the sealing ring 8 is allowed to contract and thus the inside of the container is pressure-equalized with the ambient atmosphere while the plug is still firmly locked to the filler nipple by means of the locking bolts 12. It is noted that no particular separate immobilizing structure is needed for immobilizing the sealing ring in its sealing position, in the fully closed state of the plug unit 4 by virtue of the over-the-center operation of the seal actuating spreader fingers 15.

It will be understood that the above description of the present invention is susceptible to various modifications, changes and adaptations, and the same are intended to be comprehended within the meaning and range of equivalents of the appended claims.

I claim:

1. In a closure assembly for a container, including a filler nipple formed on the container and having an inner wall provided with a depression, a plug unit having a longitudinal axis and being receivable in the filler nipple and an operating lever pivotally supported on the plug unit and having an arcuate travelling path between open and closed positions thereof; means defining an annular circumferential groove in the plug unit and a sealing ring received in said annular circumferential groove; said sealing ring having a radially outwardly expanded state in which the sealing ring sealingly engages side walls defining said annular circumferential groove and circumferential portions of said inner wall of said filler nipple for sealing fluid tight the inside of the container from the surrounding environment; said sealing ring having a relaxed, non-sealing state; the improvement comprising (a) sealing ring actuating means operatively connected to said sealing ring and said operating lever for moving said sealing ring from said relaxed state into said expanded state and from said expanded state into said relaxed state upon movement of said operating lever from an intermediate position to said closed position and from said closed position to said intermediate position, respectively; said intermediate position and said closed position of said operating lever defining limits of a first range of said arcuate travelling path;

(b) locking bolt means supported in said plug unit and having an advanced, locking state in which parts of said locking bolt means lockingly project into said depression in said filler nipple and a withdrawn, unlocking state in which said parts of said locking bolt means are in an at least partially withdrawn, unlocking position with respect to said depression; and (c) bolt actuating means operatively connected to said locking bolt means and said operating lever for moving said locking bolt means from said unlocking state into said locking state and from said locking state into said unlocking state upon movement of said operating lever from said open position to said intermediate position and from said intermediate position to said open position, respectively; said intermediate position and said open position of said operating lever defining limits of a second range of said arcuate travelling path.

2. A closure assembly as defined in claim 1, said plug unit further comprising a plug housing; said sealing ring actuating means including (a) a lifter having an outer perimeter and being supported in said plug housing for sliding motion parallel to said axis;

(b) a plurality of spreader fingers distributed about said outer perimeter of said lifter and extending generally radially outwardly therefrom relative to said axis; each said spreader finger projecting into said annular circumferential groove and having a radially outer end cooperating with an inner circumferential part of said sealing ring; and (c) supports mounted on said outer periphery of said lifter for supporting each said spreader finger at a radially inner end thereof for swinging motion of the radially outer ends generally parallel to said axis.

3. A closure assembly as defined in claim 2, wherein said sealing ring has a central radial plane; said lifter has first and second end positions; in said first end position of said lifter said supports being all located at a first side of said radial plane and said outer end of said spreader fingers allowing said sealing ring to assume said relaxed state and in said second end position of said lifter said supports being all located at a second side of said radial plane opposite said first side and said outer end of said spreader fingers forcing said sealing ring into said expanded state.

4. A closure assembly as defined in claim 2, wherein said operating lever comprises an actuator segment and said sealing ring actuating means further comprises coupling means operatively connecting said actuator segment to said lifter solely when said operating lever is in said first range of said arcuate travelling path.

5. A closure assembly as defined in claim 4, wherein said coupling means comprises a recess provided on an outer face of said actuator segment and an actuating lug affixed to said lifter and projecting outwardly therefrom; said actuating lug being nested in said recess of said actuator segment solely when said operating lever is in said first range of said arcuate travelling path.

6. A closure assembly as defined in claim 1, wherein said locking bolt means comprise two locking bolts slidable in diametrically opposite directions in a plane perpendicular to said axis; said bolt actuating means comprises a control slide movable in a plane generally perpendicular to said axis and to radial displacements of said locking bolts; first connecting means coupling said operating lever to said control slide and second connecting means coupling said control slide to said locking bolts.

7. A closure assembly as defined in claim 6, wherein said operating lever comprises an actuator segment; said first connecting means including a slot provided in said actuator segment and a pin affixed to said control slide; said pin extending into said slot and being displaced by said operating lever during motion thereof.

8. A closure assembly as defined in claim 7, wherein said second connecting means comprises a pin affixed to each of said locking bolts and slots provided in said control slide and receiving respective pins of said locking bolts; said slots in said control slide being so oriented relative to displacements of said control slide that displacements of said control slide effect displacements of said locking bolts during motion of said operating lever solely in said second range of the arcuate travelling path.

9. A closure assembly as defined in claim 8, wherein said sealing ring actuating means includes a lifter having an outer perimeter and being supported for sliding motion parallel to said axis; said control slide having a generally U-shaped configuration lying in a plane of displacement of said control slide; said U-shaped configuration having two legs straddling said lifter; said slots of said control slide being provided in said legs and said pin of said control slide connecting said legs to one another.

10. A closure assembly as defined in claim 9, said slots of said control slide each having first and second length portions arranged at an obtuse angle to one another; each first length portion being situated between the second length portion and said first connecting means; said first length portions being convergent to one another in the direction of said first connecting means and said second length portions being parallel to one another; said legs being movable towards and away from one another.

11. A closure assembly as defined in claim 10, wherein said legs of said control slide have facing inner edges each having a length portion extending parallel to the displacements of said control slide in a zone of said second length portion of said slots provided in said control slide; said length portion of said slots being in engagement with said lifter at diametrically opposite sides thereof.

12. A closure assembly as defined in claim 10, wherein said legs of said control slide have facing inner edges each having a length portion in a zone of said first length portion of respective said slots provided in said legs; said length portion of said facing inner edges having an arcuate recess curving away from the periphery of said lifter.

13. A closure assembly as defined in claim 1, wherein said plug unit further comprises a plug housing and said sealing ring actuating means includes a lifter of sleeve-like configuration; said lifter being supported in said plug housing for sliding motion parallel to said axis; in the closed position of said operating lever said lifter assuming a sealing ring-actuating position in which said sealing ring is in its said expanded state; further comprising key-operated lock means, situated within said lifter, for immobilizing said lifter in said sealing ring-actuating position.

14. A closure assembly as defined in claim 13, wherein said key-operated lock means comprises a locking bolt movable radially with respect to said axis; said locking bolt of said key-operated lock means having an advanced position in which it projects radially from said lifter and extends behind a part of said plug housing for immobilizing said lifter.

15. A closure assembly as defined in claim 14, wherein said operating lever has an opening for passage of a key of said key-operated lock means; said opening being in alignment with said key-operated lock means in the closed position of said operating lever.

16. A closure assembly as defined in claim 1, wherein said operating lever has a pivotal plane parallel to said axis; said operating lever having a first arm comprising a manually engageable handle part and a second arm comprising a pivotal actuator segment operatively articulated to said sealing ring actuating means and to said bolt actuating means.

17. A closure assembly as defined in claim 16, wherein said two arms of said pivotal lever are arranged approximately at 90° to one another.

18. A closure assembly as defined in claim 16, wherein in the closed position of said operating lever said first arm is oriented at approximately 90° to said axis and is in a face-to-face engagement with said plug unit and said second arm is oriented towards said sealing ring.

19. A closure assembly as defined in claim 16, wherein said bolt actuating means includes a control slide operatively connected to said locking bolt means and said operating lever; said control slide movable in a direction parallel to said pivotal plane of said operating lever.

20. A closure assembly as defined in claim 1, wherein said locking bolt means comprise two locking bolts slidable in diametrically opposite directions in a plane perpendicular to said axis; said bolt actuating means comprises a control slide movable in a plane generally perpendicular to said axis and to radial displacements of said locking bolts; first connecting means coupling said operating lever to said control slide and second connecting means coupling said control slide to said locking bolts, further wherein at least one of said locking bolts has an oblique terminus projecting slightly into said depression of said filler nipple in said withdrawn state of said locking bolt means, whereby said plug unit is slightly retained in said filler nipple in the open position of said operating lever.

* * * * *